March 19, 1963 J. A. MOORE 3,082,022
COUPLING FOR PLASTIC PIPE HAVING SEGMENTED
INTERLOCKED CLAMPING RINGS
Filed Nov. 3, 1958 4 Sheets-Sheet 1

James A. Moore
INVENTOR.
BY Albert H. Kirchner
Attorney

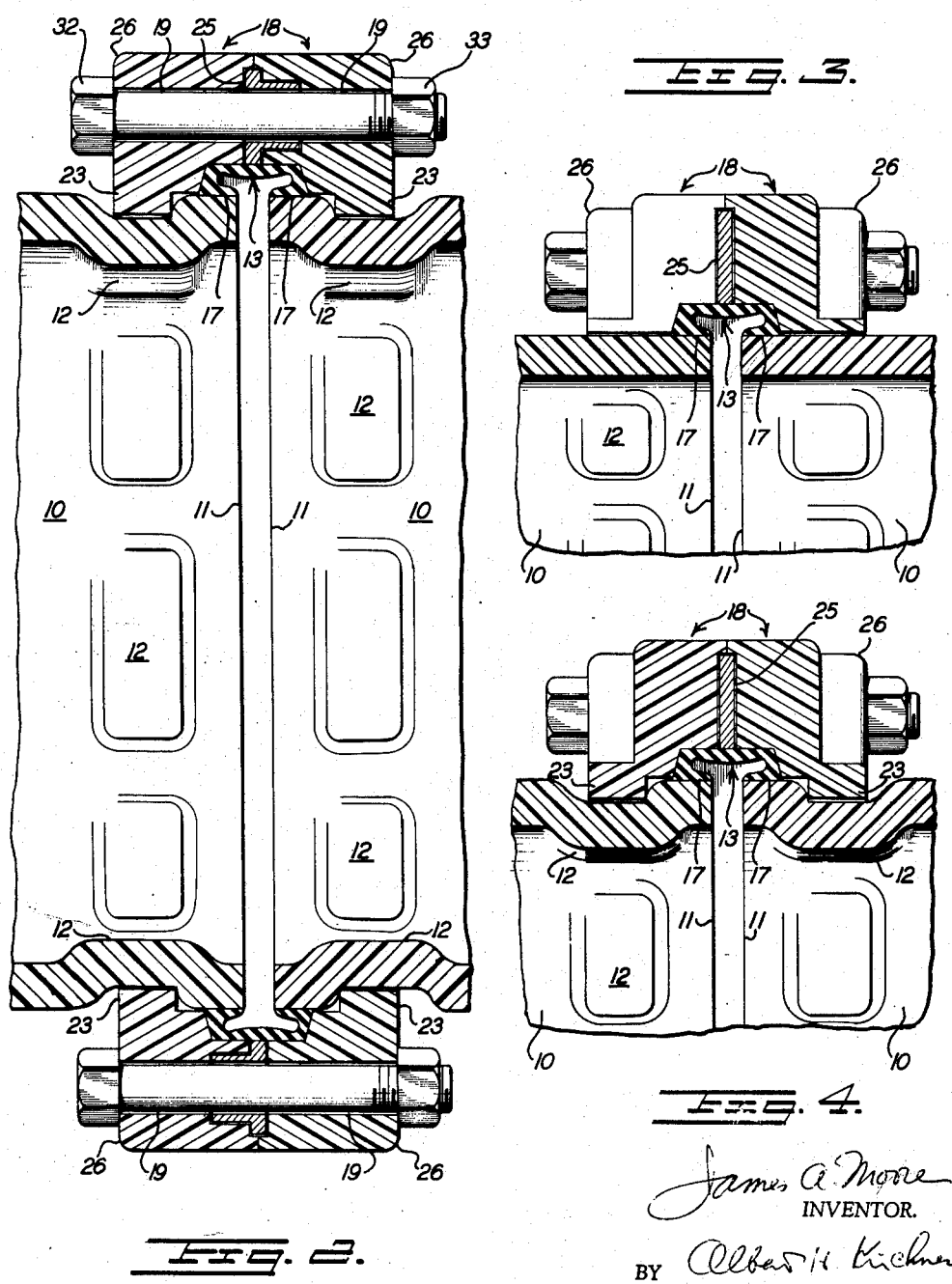

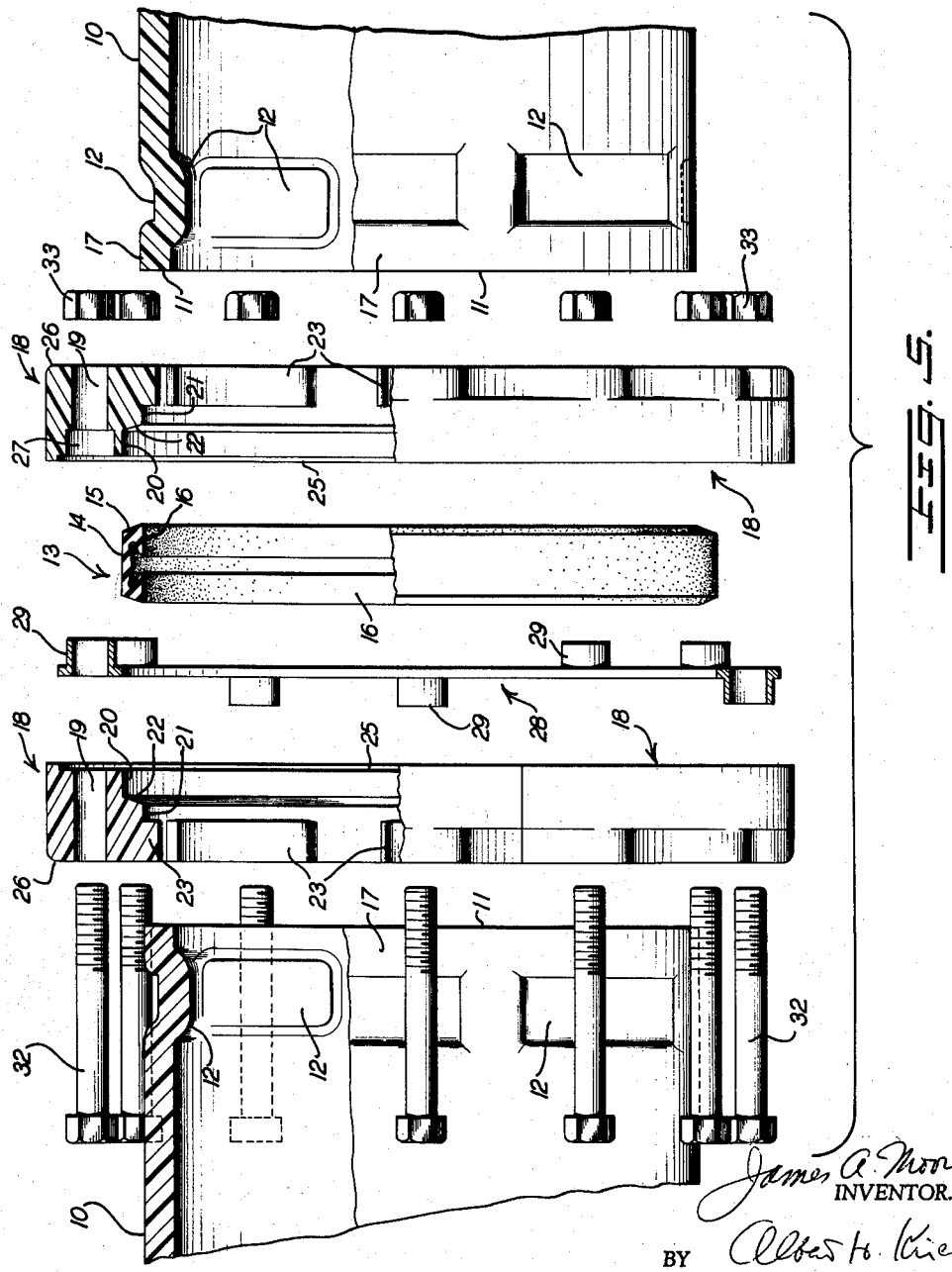

March 19, 1963 J. A. MOORE 3,082,022
COUPLING FOR PLASTIC PIPE HAVING SEGMENTED
INTERLOCKED CLAMPING RINGS
Filed Nov. 3, 1958 4 Sheets-Sheet 4

James A. Moore
INVENTOR.

BY Albert H. Kirchner
Attorney

United States Patent Office 3,082,022
Patented Mar. 19, 1963

3,082,022
COUPLING FOR PLASTIC PIPE HAVING SEG-
MENTED INTERLOCKED CLAMPING RINGS
James A. Moore, 4101 Valley View Road,
Knoxville, Tenn.
Filed Nov. 3, 1958, Ser. No. 771,571
6 Claims. (Cl. 285—112)

The present invention relates to couplings for plastic pipe and more particularly to connector assemblies for effecting quick, permanent yet readily separable, rigid yet appreciably flexible and expansible-contractile junctions, readily made in the field or on the job, between the ends of sections of such types of piping as are widely used in the chemical and other industries as conduits for fluids, both liquid and gaseous, which for one reason or another cannot be conveyed by conventional metal pipe.

These plastic pipes are typically thermoplastic, such as polyvinyl chloride principally, or acrylic, acetate and butyrate plastics, rubber base plastics, polyethylene and the like, and they present special problems in making connections between sections, quite different from the requirements and capabilities of metal pipe that can be threaded, as in the case of ferrous metals, or fused as in the case of lead. These latter expedients are generally impractical for even small diameter plastic pipe intended for installation under the most favorable conditions and for uses requiring no provision for flexing, expansion, contraction, etc., and they are wholly inapplicable to plastic pipe of relatively large diameter, or pipe that must be installed in positions and locations that are accessible with difficulty, or pipe that in use must withstand relatively wide ranges of temperature, vibration and other harmful influences.

A principal object of the present invention therefore is to provide a novel coupling that can be applied to seal the juxtaposed ends of sections of plastic pipe with a minimum of preparation, expense and difficulty, under substantially any conditions of position and location, for long service under hard use, in a joint whose tightness increases with rise in internal pipe pressure, by means involving no tight clamping or compressing of the pipes, which will generally obviate the prior art objections and difficulties hereinabove suggested and which will embody numerous advantages and useful features as will be more apparent as the present specification proceeds.

The invention is illustrated in this application for Letters Patent as embodied in certain forms that have been tested in actual practice and found satisfactory and hence are at present preferred. These are depicted in the accompanying drawings, in which FIGURE 1 is a transverse cross section through a pipe joint showing one form of the new coupling in end elevation;

FIG. 3 is an axial cross section through one side only of the joint and coupling, taken on the line 3—3 of FIG. 1;

FIG. 4 is an axial cross section through one side only of the joint and coupling, taken on the line 4—4 of FIG. 1;

FIG. 5 is an exploded view, partly in axial cross section and partly in side elevation, of the juxtaposed ends of two pipe sections and the full complement of coupling elements which, when assembled and mounted on the sections, constitute the joint;

FIG. 6 is a side elevational view of one of the six segments of the coupling;

Figures 1, 2, 7:
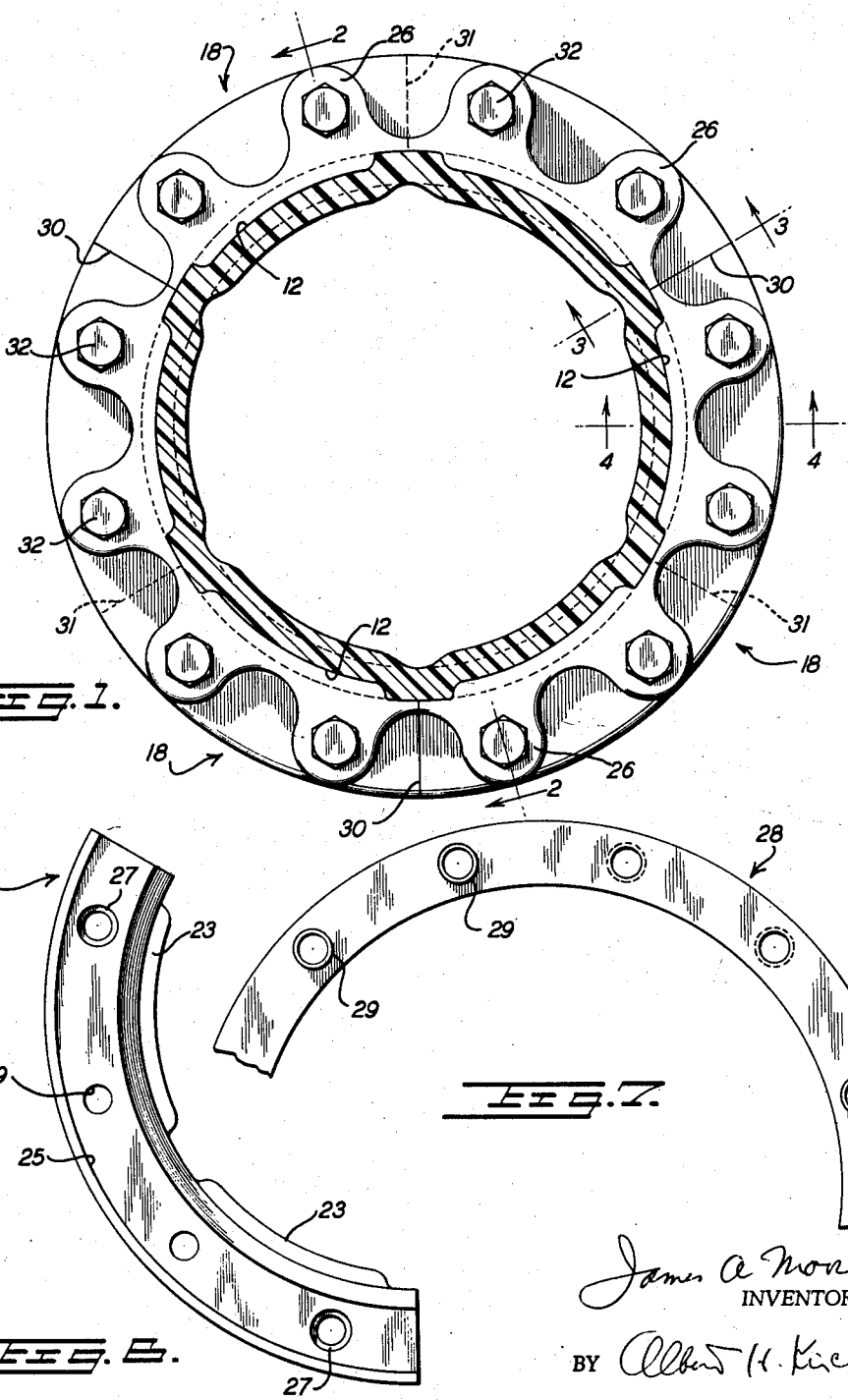
FIG. 2 is a central axial cross section through the joint and coupling taken on the line 2—2 of FIG. 1.
FIG. 7 is a side elevational view of substantially one-half of the retaining ring element of the coupling.

But these embodiments of the invention as shown in the figures and hereinafter described are selected merely to illustrate preferred forms of the structures in support of the broader of the appended claims which define the inventive principles, and it is to be understood that those principles are capable of modification and alteration within the limits defined by the claims, so that the illustrative constructions may be varied and features may be added and subtracted within the scope of the invention and the comprehension of the claims.

In the drawings, the reference numeral 10 designates each of the similar ends of a pair of sections of plastic pipe that are to be coupled together in a strong, permanent yet readily separable, relatively flexible joint in accordance with the principles of the invention. For purposes of illustration only, and by no means by way of limitation, the pipe may be assumed to be of some eight or more inches in diameter and formed of extruded polyvinyl chloride, which is a familiar type of conduit widely used in the chemical and related industries for conducting fluids, both gaseous and liquid, that are highly corrosive to most metals so that conventional metal piping cannot be used.

According to the invention the pipe ends 10, having been cut to proper length either in manufacture or on the job, and being thereby provided with reasonably accurately diametrical square edges 11, are processed in any convenient manner, as by use of a special tool which forms the subject of a separate application for Letters Patent, so as to be impressed radially, in circumferentially spaced areas, with a series of equidistant notches or indentations 12. This notching is easily accomplished by the use of appropriate dies under heat and pressure, so that the operation produces no thinning of the pipe wall, i.e., no reduction in wall thickness at any point, and the several notches are identical in area, depth and distance from the pipe end edge 11 and are all equidistantly spaced. A convenient number in which to provide the notches is six, as shown in the drawings, but it will be understood that this number is not critical and may be increased or reduced for pipes of different diameters or for other reasons. No further processing of the pipe sections is required to prepare them to be joined by the new coupling.

The two pipe sections are aligned, with their end edges 11 axially spaced in parallel planes as shown in FIG. 2, and a specially made sealing ring 13 is sleeved over the juxtaposed ends in straddling relation to the space between them. This ring is continuously and uninterruptedly circular and is essentially of uniformly U-shaped cross section, having a substantially flat strip-like back or body portion 14 and a pair of identical side flanges 15 radially instanding from the edges of the body portion. Preferably these side flanges terminate in oppositely directed flat bottomed base flanges 16, so that the channel of the ring is a continuous annular pocket that is substantially T-shaped in cross section. The ring is made of flexible, elastic and resilient rubber or other material of like properties, such for example as one or another of the class of artificial rubbers typified by neoprene. Depending on such considerations as the kind of fluid to be conveyed, the ring may be made of a plastic having the required physical properties, such for example, as polyethylene.

The ring 13 is sleeved over the space between the pipe section ends in symmetrical relation to the two ends, with the back 14 of the ring straddling the space and the side flanges 15, or the flat bottomed bases 16 thereof, seated on the extreme end edge zones 17 of the pipe sections. In each section this zone lies between the notches 12 and the end edge 11, and is quite flat surfaced or uninterruptedly cylindrical so that the ring 13 makes snug seating on both pipe sections, completely around their full peripheries, and provides a hollow pocket, of channel shape or of the T-shaped cross section mentioned, in open communication throughout the whole inner circumference of the ring, with the bore of the piping.

The ring 13 is maintained in its sealing position, just described, by an assembly of clamping segments 18. In the illustrated embodiments of the invention, for cooperation with pipe ends each having the six notches shown in the drawings, it is convenient to provide six of the segments 18. All are identical and may be cast in the same mold from any suitable hard-setting plastic, e.g., polyvinyl chloride, polyethylene, nylon, or any of many butyrates, acrylic plastics and the like. Each of the six segments comprises exactly one hundred and twenty degrees of arc, so that a set of three segments, engaged end to end, forms a complete circle or constitutes an annular assembly. The proportions, dimensions and shape of the segments are such that an assembly of three can be fitted over each pipe section end, made fast thereon, with the two assemblies held together against axial separation and the individual segments restrained against radial expansion, so as to provide an annular pocket enclosing the sealing ring 13 with the result that the sections are coupled together in sealed relation.

This is accomplished by the special shape of the segments in combination with certain cooperating elements that will now be described.

The segments 18 are all identical. Each of them is provided with a plurality of axially directed holes 19, which may be four in number in the 120° form of segment. The outer periphery may be quite smooth and of cylindrical plane, but the inner periphery is stepped at one side, which may be called the outer side (because it is intended to become positioned out on the extreme outer end of a pipe section as will hereinafter appear) to provide an outermost inner peripheral cylindrical surface 20 on the same radius as the outer surface of the back or body portion 14 of the sealing strip 13 and another inner peripheral cylindrical surface 21 concentric with the surface 20 but on a radius slightly greater than that of the outer peripheral surface of the pipe section. The surfaces 20 and 21 are connected by a surface 22 which is frusto-conical in shape or is otherwise contoured to conform approximately to the outer face of a side flange 15 of the sealing strip 13. Along the side of the segment 18 opposite its surface 20 and hence adjacent to its surface 21, which side may be called inner side of the segment (because it is intended to be mounted on the pipe section inwardly from the end of the section), the segment is provided with projections, in the number of two in the present instance, each comprising a radially instanding lug 23 conforming in length to the length of one of the notches 12 and being considerably narrower than the notch and having an inner periphery that is cylindrical on a radius slightly greater than that of the bottom of the notch.

The arrangement is such that, as is probably best shown in FIGS. 2, 3 and 4, an assembly of three segments may be mounted as a complete annulus on each pipe section end with the lugs 23 seated in the notches 12 and with the pocket formed by the segment surfaces 20, 21 and 22 enclosing and embracing substantially one axial half of the sealing ring 13, previously mounted in straddling position over the space between the end edges 11 of the sections. It will be evident that as long as this relationship of the parts is maintained the sections will be kept coupled together in sealed relation the tightness of which becomes enhanced with increase in pressure in the piping because the greater the internal pressure the more forcibly will the inner ends of the side flanges 15 of the sealing ring, or the base flanges 16 thereof, be expanded into engagement with the extreme end edge zones 17 of the pipe sections.

The parts may be maintained in this required relationship, and the physical strength of the coupling may be enhanced, by means that will now be described.

The radial outer side of each of the segments is counterbored to provide a shallow seat 25 inset axially from the segment surface. The opposite, or radial inner side, of the segment is enlarged around each of the holes 19 in the segment to form an axially protruding boss 26. A number of the holes 19 are counterbored or socketed from the outer side of the segment, as shown at 27 in FIGS. 5 and 6, and an equal number are left uncounterbored and unsocketed. In that embodiment of the invention each segment contains four holes 19, and it will be observed that the two endmost holes are provided with counterbored sockets, and the two inner holes are left uncounterbored, i.e., are not provided with sockets A reinforcing and retaining ring 28, in the form of a generally flat washer made of steel or equivalent strong metal, is provided to fit in the oppositely facing shallow seats 25 of two assembled sets of segments. For this purpose the ring 28 has an axial thickness equal to about double the depth of each shallow seat 25 and has an outer diameter equal to that of the seat. Its inner diameter is about that of the outer diameter of the back 14 of the sealing ring 13. To fit into the counterbores 27 of the segment holes 19 the ring 28 has axially projecting from its opposite side faces a plurality of lugs in the form of collars 29, each surrounding a hole in the ring. The collars are fixed to the sides of the ring, as by welding or by being formed integrally with the ring or otherwise, and they are provided in the same number as the holes 19 in one assembly of segments, i.e., twelve in the illustrated embodiment of the invention in which each of the three segments of the two assemblies is provided with four holes. This arrangement is probably best shown in FIGS. 6 and 7, in which it is also seen that the collars 29 project in adjoining pairs from each side face of the ring, i.e., six collars project from each side, with pairs of collars on one side being staggered, peripherally around the ring, with pairs projecting from the other side.

It will be remembered that the counter bores 27 are provided on the outer side face of the segments 18 and in the end holes only, the two inner holes being left uncounterbored, as shown in FIG. 6. It will be evident, therefore, that when the three segments are engaged to form a circular assembly, the resulting annulus will present six counterbores on its outer side face, staggered in pairs with pairs of holes that are uncounterbored. This, of course, will be true of both of the two annuli or circular assemblies. Now, referring to the reinforcing and retaining ring 28 as seen in FIG. 7, it will be noted that the collars 29 extend in adjacent pairs from the opposite faces of the ring (two together extending from one face, followed peripherally around the ring by two projecting from the other face, etc.). The arrangement is such that, with the segments assembled in two identical annuli, the sockets 27 will accommodate the lugs 29 in only one relationship of the annuli, i.e., a relationship in which the individual segments assembled in one annulus are staggered relatively to the segments of the other assembly or annulus. Thus the joints between the segments of each assembly lie on radii which are midway between the joints of the other assembly, as shown in FIG. 1, where the solid lines 30 indicate the joints between segments on the near side of the coupling and the dotted lines 31 indicate the same kind of joints between segments on the far side. In this way the physical or mechanical strength of the coupling is materially increased.

The aligned bosses 26 of the two assemblies of segments provide thick, and hence stout and strong, enclosures for a series of fastening elements, such as the conventional machine bolts 32 which are passed through the bores of the bosses to receive nuts 33 which are tightened up to clamp the segment assemblies together, with the retaining ring 28 seated between the assemblies and the sealing ring 13 pocketed between the assemblies and the ends of the pipe sections, all as shown in FIGS. 1, 2, 3 and 4. It will be recognized that the segment material surrounding the bolts 32, which has been fashioned as bosses and so described, could as well be left continuous, with no material removed from between the bores. However, in the interest of economy of material, and to enhance the appearance of the coupling and facilitate locating the holes 19, it is preferable to mold the segments with pronounced bosses as shown.

As has been explained, the parts are so proportioned that a small clearance is provided between the inner peripheries or surfaces of the segment lugs 23 and the bottoms of the pipe section end notches 12. This clearance is shown in FIGS. 2 and 4 and is deemed to be important because it permits the sections to be shifted from exact alignment after being coupled, or to be coupled in intentional misalignment, as is often required in making installations, particularly of heavy, large diameter industrial piping.

Figures 8, 9:
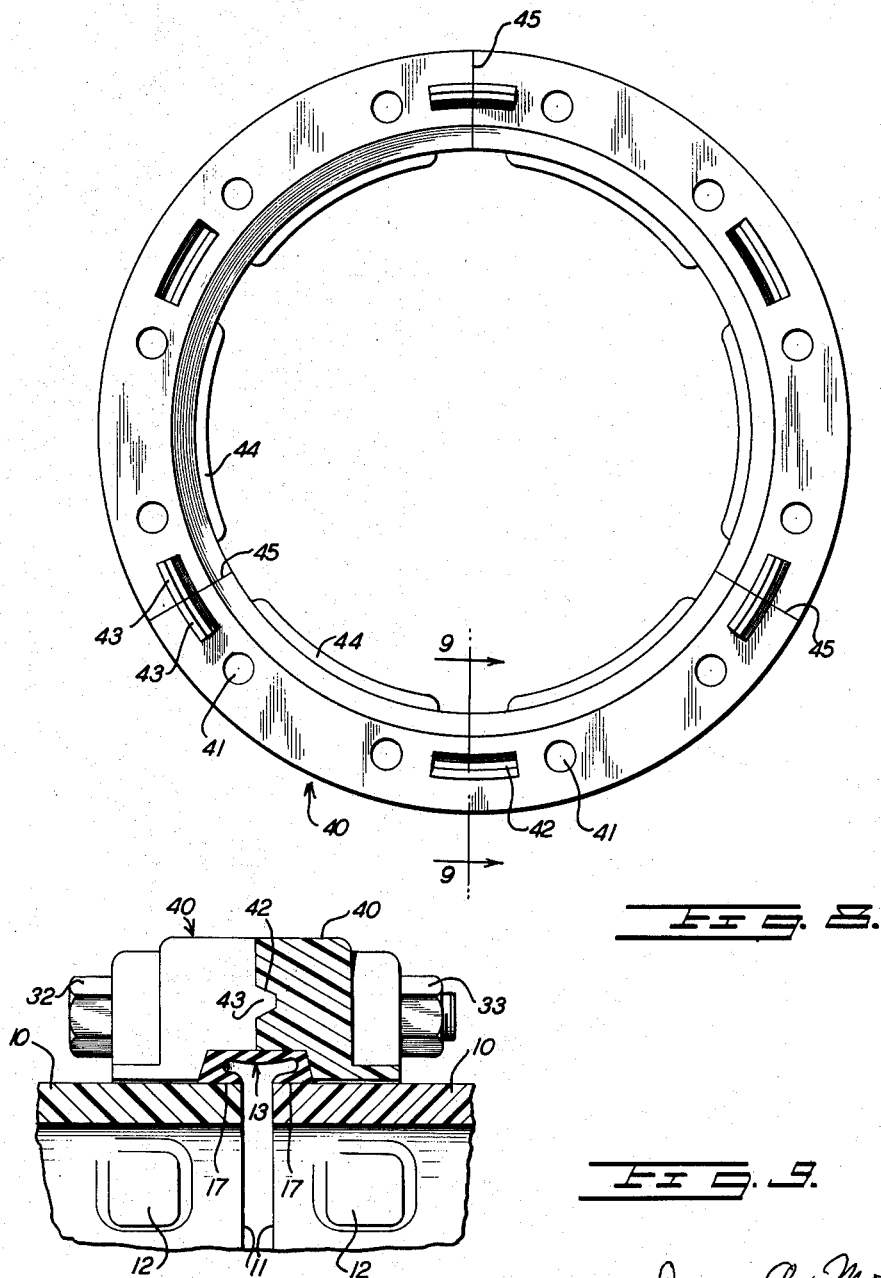
FIG. 8 is an end elevational view like that of the coupling in FIG. 1 but showing a slightly modified form of coupling, assembled without the pipe sections that are shown in FIG. 1.
FIG. 9 is an axial cross section through one side only of the coupling shown in FIG. 8, taken on the line 9—9 of FIG. 8, but showing the coupling mounted on the ends of a pair of pipe sections.

FIGS. 8 and 9 illustrate a slight modification of the structure of FIGS. 1-7. In FIGS. 8 and 9 the retaining ring 28 is eliminated. The pipe section ends are formed with notches 12 and preferably with squared end edges 11, and the intervening space is straddled by a sealing ring 13, all as in the first described form. However, the segments, here designated 40, have their opposed, radial outer sides (the sides which in the segments 18 are formed with the shallow seats 25) provided with lug and socket means in the form of tongues and grooves for interfitting to seat the two assemblies of segments together. If the segments be provided in the number of three for each assembly, as shown in FIG. 8, it is convenient to provide each segment with four holes 41 for the reception of bolt and nut fastening means exactly like the arrangement of the segments 13 except that none of the holes is counterbored. To interfit the segment assemblies together in the absence of a retaining ring, and to insure staggering of the inter-segment joints, each of the segments 40 is provided, on its radial outer side, with a socket in the form of a short groove 42 at its center of arc and a lug in the form of a still shorter tongue 43, half the length of the groove, at each extreme end of the segment.

Each of the segments 40 has a pair of lugs 44 instanding from its internal periphery. These are identical in form and function with the lugs 23 of the segments 18, so that they fit into the notches 12 of the pipe sections when two assemblies of segments 40 are fitted onto the sections, over a sealing ring 13, and clamped in position by a series of bolts 32 standing through the holes 41.

It will be recognized that staggering of the inter-segment joints 45 of the two engaged segment assemblies is insured because it is possible to engage the two assemblies only by fitting the contacting, aligned two end tongues 43, 43 of one assembly into the central groove 42 of the other assembly.

It is believed that the manner of assembly and installation of the coupling, in either form of embodiment as well as in the numerous variations that will suggest themselves to those skilled in the art, will be clear from the foregoing description of the structures. Suffice it to say that, the pipe section ends having been properly notched either as an incident to their manufacture or by a simple tool applied at the site of installation, the sealing ring 13 is slipped over one section, the other section is held in proper alignment and spacing with the first, the sealing ring is adjusted to its position straddling the space between the sections, the several segments 18 or 40 of the two assemblies are put in place with the lugs 25 or 44 seated in the notches 12 and with the retaining ring 28 interposed between the assemblies in the case of the segments 18, and the nuts and bolts 32, 33 are applied and tightened. The coupling is thus complete and is operative to hold the sections together in a sealed relationship that becomes tighter with increase in internal pressure, as has been explained.

The pipe sections are free to expand and contract with changes of temperatures because the space between the sections and the excess of width of the notches 12 over the width or thickness of the lugs 23 or 44 permit the end edges 11 of the sections to move toward each other on elongation of the sections resulting from heating, thus tending to close up the space between the sections from what may be regarded as the cold position of maximum separation shown in FIGS. 2, 3, 4 and 9.

It may be observed that the only operation on the pipe sections required to prepare them to receive the coupling elements is the indenting to form the notches 12. As is explained more fully in a companion application disclosing and claiming a tool for introducing these notches, this is a very simple process, requiring substantially no skill or experience, easily performed on the job, with piping in positions and locations in which it would be very difficult or impossible to cut threads or continuous grooves as required by certain prior art types of coupling. Moreover, the notches 12 involve no loss of pipe material and no reduction in wall thickness, so that the sections are in no wise weakened. Indeed, the spaced notches actually increase the strength of the pipe section ends by acting as rigidifying ribs and by serving to interrupt and dissipate the effects of environmental stresses such as may result from vibration, point pressure, shocks, blows and the like. In such cases the notch indentations serve as barriers that stop the running of a fracture or a stress that might otherwise produce a fracture if the pipe wall were continuous and uniform in both axial and circumferential directions.

While it has been stated hereinabove that the end edges 11 of the pipe sections which are to be coupled together should be reasonably accurately diametrical and "square," so as to provide seats of substantially equal area all around the peripheries of the pipe sections for the bottoms 16 of the side flanges of the sealing ring 13, it will be appreciated that this is not absolutely essential and that it is immaterial if the extreme end edge of a section be marred, chipped or otherwise damaged as long as the sealing ring bottom can be pressed, by fluid pressure in the piping, down into tight sealing engagement with the damaged area, or as long as some of the zone back of the damaged area can be so engaged. Thus it is unnecessary to protect the ends of the sections with the care required of threaded ends, and of course the location of the indentations 12 back from the ends, and inwardly from the periphery of the pipe, constitutes good protection for these features if the pipes be made and shipped with the indentations preformed in them.

The clearances between the coupling segments and the adjacent pipe wall surfaces, shown in FIGS. 2, 3 and 4 and heretofore mentioned, render a given size of coupling independent of individual variations in the outside diameter of pipe of the size the coupling is intended to fit. Tolerances of 5% are commonly allowed in polyvinyl chloride piping in the range of sizes to which the present couplings are applied. Thus as much as nearly 10% difference in these diameters can be encountered in the two sections to be coupled. The operation of introducing the notches may be relied on to form such sections to proper diameter, but even if this is not accomplished the engagement of the segments in the notches is adequate and the tightness of the seal is unaffected, because the fit of the lugs in the notches may permissibly vary from substantial contact, as indicated in FIG. 1, to the appreciable spacing shown in FIGS. 2 and 4.

A related advantage of this feature of the construction is that the pipe ends are coupled in a tight seal without imposing any appreciable gripping or clamping pressure on them. Thus the nuts and bolts 32, 33 or equivalent fastening means may be tightened to any degree, far beyond that which is required to hold the two segment assemblies together, without in any way increasing the stress on the pipe sections.

One advantage of the metallic retaining ring 28 used in the FIGS. 1-7 embodiment is that it materially strengthens the coupling and permits thinner segments to be used. It will be noted that when installed in the coupling the ring is fully protected, by the sealing ring 14, from the contents of the piping and, by the material of the segments themselves, from the external atmosphere. Thus no problem of corrosion or attack from within or without the piping is presented, and the ring need not be made of any special or expensive metal or other corrosion resistant material.

Still referring to the reinforcing and retaining ring 28, it will be noted that one effect of the collars 29, seated in the counterbores 27 of the segment holes 19, is to lock the abutted ends of the segments 18 securely together against radial expansion which would be objectionable as opening the intersegment joints 30 and 31 (see FIG. 1). The holes 19, and the bores of the collars, can be made of larger diameter than the shanks of the bolts 32, and even though the bolts become loosened the fit of the collars in the counterbores will hold the segments of each annular assembly in proper end-to-end engagement. In this connection it may be stated that the collars and counterbores may to advantage be correspondingly or complementally tapered to improve the seating of the collars in the counterbores. This expedient promotes ease of assembly and makes for easier molding.

Finally, in connection with the matter of tightness of the assembly of segments, the phenomenon of "plastic memory" plays a part. The notches 12, having been formed by radially inward pressure applied while the plastic material of the pipe is heated, leave the notched area of the pipe in a condition of some strain when cooled. If then the area become sufficiently elevated in temperature to tend to soften the material, the "plastic memory" asserts itself in the tendency of the bottoms of the notches to expand toward their original planes in the circular wall of the pipe. This of course results in pressing the outer wall surface of the pipe against the inner surface of the joint segments and thus improves the tightness of the joint.

Numerous other and further advantages are inherent in the new coupling, as will be understood by those familiar with the special problems and requirements involved in connecting sections of plastic pipe in tightly sealed joints.

I claim:

1. A coupling for the axially juxtaposed axially aligned adjacent end zones of a pair of sections of plastic pipe having radial indentations preformed in their outer peripheries in marginal zones inset axially from their adjacent end edges, said coupling comprising the combination of a sealing ring of rubber-like material and inwardly open channel shape sleeved over and straddling the joint between the ends of the sections, a plurality of arcuate segments of rigid material separable from the pipe sections and disposed in two completely annular separate assemblies each comprising plural segments having their ends engaged in radial joints, said assemblies cooperating in juxtaposed side by side relation to provide a composite ring having an inner peripheral channel substantially conforming to the radial and axial outer periphery of the sealing ring and engaged therewith and having radially instanding integral projections each seated in one of said pipe section indentations, complemental interlocking lug and socket means interposed between the axially juxtaposed segment faces of the two annular assemblies so constructed and arranged as to restrain the segments of each assembly against radial separation from each other and interengageable only in a relation in which the two assemblies are interlocked in a relatively staggered relationship of the radial end joints of the assembly segments, and means exerting axial compression on the two assemblies to maintain them axially clamped together and keep the joints of the segments thereof in said staggered relationship.

2. A coupling as claimed in claim 1 in which the complemental interlocking means interposed between the juxtaposed faces of the two annular assemblies is a retaining ring inset in said faces and having axially projecting elements extending into axial openings in the segments.

3. A coupling as claimed in claim 2 in which the axially projecting elements are hollow and the axial openings extend entirely through the segments and the means exerting axial compression on the two assemblies are bolts standing through said elements and openings.

4. A coupling as claimed in claim 2 in which the axial openings in the segments extend entirely through the segments and are counterbored and the axially projecting elements fit snugly into said counterbores and are hollow and the means exerting axial compression on the two assemblies are bolts standing through said elements and openings.

5. A coupling as claimed in claim 1 in which the complemental interlocking means interposed between the juxtaposed faces of the two annular assemblies are cooperating interfitted tongues and grooves formed on said faces.

6. A coupling as claimed in claim 1 in which the complemental interlocking means interposed between the juxtaposed faces of the two annular assemblies are complemental tongue and groove elements formed on said faces, each assembly face having identical half-length elements at each of its ends and a full length complemental element formed intermediate its ends.

References Cited in the file of this patent

UNITED STATES PATENTS

| 361,319 | Paxson | Apr. 19, 1887 |
|---|---|---|
| 612,455 | Gore | Oct. 18, 1898 |
| 898,088 | Boyd | Sept. 8, 1908 |
| 943,461 | Reynolds | Dec. 14, 1909 |
| 1,462,698 | Haughey | July 24, 1923 |
| 1,784,667 | Gillet | Dec. 9, 1930 |
| 1,967,467 | Damsel | July 24, 1934 |
| 2,046,545 | Brickman | July 7, 1936 |
| 2,303,311 | Gredell | Nov. 24, 1942 |
| 2,362,454 | Damsel | Nov. 14, 1944 |
| 2,376,566 | Woodling | May 22, 1945 |
| 2,473,102 | Krooss | June 14, 1949 |
| 2,777,715 | Beyer | June 15, 1957 |
| 2,821,415 | Race | Jan. 28, 1958 |
| 2,857,175 | Browning | Oct. 21, 1958 |

FOREIGN PATENTS

| 584,100 | France | Nov. 13, 1924 |
|---|---|---|
| 450,187 | Great Britain | July 13, 1936 |